United States Patent
Cui et al.

(10) Patent No.: US 11,190,943 B2
(45) Date of Patent: *Nov. 30, 2021

(54) SOFTWARE-DEFINED EXTENDED ACCESS NETWORK FOR INTERNET-OF-THINGS FOR A 5G OR OTHER NEXT GENERATION NETWORK

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Erie Lai Har Lau, Redmond, WA (US); Sangar Dowlatkhah, Alpharetta, GA (US)

(73) Assignees: AT&T INTELLECTUAL PROPERTY I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,116

(22) Filed: Sep. 17, 2020

(65) Prior Publication Data

US 2021/0006979 A1    Jan. 7, 2021

Related U.S. Application Data

(63) Continuation of application No. 16/022,065, filed on Jun. 28, 2018, now Pat. No. 10,827,358.

(51) Int. Cl.
*H04W 16/02* (2009.01)
*H04W 4/70* (2018.01)
(Continued)

(52) U.S. Cl.
CPC ............ *H04W 16/02* (2013.01); *H04W 4/70* (2018.02); *H04W 72/0453* (2013.01);
(Continued)

(58) Field of Classification Search
CPC ... H04W 16/02; H04W 4/70; H04W 72/0453; H04W 72/0493; H04W 72/085; H04W 84/12
(Continued)

(56) References Cited

U.S. PATENT DOCUMENTS 7,656,815 B2    2/2010   Kellerer et al.
7,656,901 B2    2/2010   Strutt et al.
(Continued)

FOREIGN PATENT DOCUMENTS

WO    2012055277 A1    5/2012
WO    2016180068 A1    11/2016
(Continued)

OTHER PUBLICATIONS

Ruiz, Linnyer Beatrys, et al. "Manna: A Management Architecture for Wireless Sensor Networks." IEEE communications Magazine. 41.2 (2003):116-125.http://citeseerx.ist.psu edu/viewdoc/download?doi= 10.1.1.449.4421 &rep=rep1&type=pdf.
(Continued)

*Primary Examiner* — James E Springer
(74) *Attorney, Agent, or Firm* — Amin, Turocy & Watson, LLP

(57) ABSTRACT

A framework of abstraction of new and existing 5G radios can enhance capabilities of new and existing micro radios and other short range radio technologies to enable intelligent service delivery, dynamic access learning capability, and network slicing over 5G access networks. Enhancing layer communication for both control and user plane can be tunneled through the hosting layer and exploit a common transport provided by the hosting layer. The tunneling through the hosting layer can also enable the enhance capabilities to access the same radio management functions and can be orchestrated by the same core function. Addi-
(Continued)

tionally, provisioning processes can be reduced based on the types of Internet-of-things devices being previously connected to a software-defined networking device.

20 Claims, 13 Drawing Sheets

(51) Int. Cl.
  *H04W 72/04* (2009.01)
  *H04W 72/08* (2009.01)
  *H04W 84/12* (2009.01)

(52) U.S. Cl.
  CPC ..... *H04W 72/0493* (2013.01); *H04W 72/085* (2013.01); *H04W 84/12* (2013.01)

(58) Field of Classification Search
  USPC .......................................................... 709/226
  See application file for complete search history.

(56) References Cited

U.S. PATENT DOCUMENTS

| | | | |
|---|---|---|---|
| 7,953,580 | B2 | 5/2011 | Cleary et al. |
| 8,442,030 | B2 | 5/2013 | Dennison |
| 9,001,659 | B2 | 4/2015 | Sun et al. |
| 9,113,352 | B2 | 8/2015 | Agarwal et al. |
| 9,276,877 | B1 | 3/2016 | Chua et al. |
| 9,602,387 | B2 | 3/2017 | Wood |
| 9,888,397 | B1 | 2/2018 | Puranik et al. |
| 9,913,151 | B2 | 3/2018 | Li et al. |
| 9,929,949 | B2 | 3/2018 | Mahadevan et al. |
| 10,405,193 | B1 | 9/2019 | Cui et al. |
| 10,433,177 | B2 | 10/2019 | Kodaypak et al. |
| 2006/0056315 | A1 | 3/2006 | Oman et al. |
| 2012/0154195 | A1 | 6/2012 | Nystrom et al. |
| 2013/0326502 | A1 | 12/2013 | Brunsman et al. |
| 2014/0233374 | A1 | 8/2014 | Elliott |
| 2014/0307556 | A1 | 10/2014 | Zhang |
| 2014/0362730 | A1 | 12/2014 | Zhang et al. |
| 2015/0055623 | A1 | 2/2015 | Li et al. |
| 2016/0150460 | A1 | 5/2016 | Leroux et al. |
| 2016/0255052 | A1 | 9/2016 | Barraclough et al. |
| 2016/0270101 | A1 | 9/2016 | Lee et al. |
| 2017/0019817 | A1 | 1/2017 | Senarath et al. |
| 2017/0041106 | A1 | 2/2017 | Srivastava et al. |
| 2017/0078153 | A1 | 3/2017 | Zhang et al. |
| 2017/0164349 | A1 | 6/2017 | Zhu et al. |
| 2017/0295409 | A1 | 10/2017 | Simon et al. |
| 2017/0318468 | A1 | 11/2017 | Aijaz |
| 2017/0331929 | A1 | 11/2017 | Zielinski et al. |
| 2017/0367081 | A1 | 12/2017 | Cui et al. |
| 2018/0046501 | A1 | 2/2018 | Tsirkin |
| 2018/0063763 | A1 | 3/2018 | Gupta et al. |
| 2018/0288695 | A1 | 10/2018 | Tchigevsky et al. |
| 2020/0008105 | A1 | 1/2020 | Cui et al. |

FOREIGN PATENT DOCUMENTS

| | | |
|---|---|---|
| WO | 2017143139 A1 | 8/2017 |
| WO | 2017203228 A1 | 11/2017 |

OTHER PUBLICATIONS

Marina, Mahesh K., et al .. "A topology control approach for utilizing multiple channels in multi-radio wireless mesh networks." Computer Networks 54.2 (2010): 241-256. https://www.era.lib.ed.ac.uk/bilslieam/handle/1842/3775.

Klein, Mark H., et al. "Attribute-Based Architecture Styles". Software Architecture. Springer, Boston, MA, 1999,225-243.https://link.springer.eom/content/pdf/10.1007/978-0-387-35563-4_13.pdf.

Gudipati, Aditya, et al. "SoftRAN: Software Defined Radio Access Network." Proceedings of the second ACM SIGCOMM workshop on Hot topics in software defined networking. ACM, 2013.http://www.cs.princeton.edu/courses/archive/fall13/cos597E/papers/softran.pdf.

Handziski, Vlado, et al. "Flexible Hardware Absliaction for Wireless Sensor Networks." WirelessSensor Networks, 2005. Proceeedings of the Second European Workshop on. IEEE, 2005.http://people.eecs.berkeley.edu/-culler/paper/ewsn05-fha.pdf.

Fiorani, Matteo, et al. "Transport Abstraction Models for an SON-Controlled Centralized RAN." IEEE Communications Letters 19.8 (2015): 1406-1409. https://people.kth.se/-pmonti/Files/CL2015Matteo.pdf.

Khan, Sha Nawaz, et al. "Virtualization of spectrum resources for 5G networks." Networks and Communications (EuCNC), 2017 European Conference, IEEE,2017. https://www.researchgate.net/publication.

Non-Final Office Action received for U.S. Appl. No. 16/022,065 dated Aug. 21, 2019, 31 pages.

Final Office Action received for U.S. Appl. No. 16/022,065 dated Feb. 19, 2020, 29 pages.

Notice of Allowance received for U.S. Appl. No. 16/022,065 dated Jun. 18, 2020, 39 pages.

SOFTWARE-DEFINED EXTENDED ACCESS NETWORK FOR INTERNET-OF-THINGS FOR A 5G OR OTHER NEXT GENERATION NETWORK

RELATED APPLICATION

The subject patent application is a continuation of, and claims priority to, U.S. patent application Ser. No. 16/022,065 (now U.S. Pat. No. 10,827,358), filed Jun. 28, 2018, and entitled "SOFTWARE-DEFINED EXTENDED ACCESS NETWORK FOR INTERNET-OF-THINGS FOR A 5G OR OTHER NEXT GENERATION NETWORK," the entirety of which application is hereby incorporated by reference herein.

TECHNICAL FIELD

This disclosure relates generally to facilitating a dynamic radio access network and an intelligent service delivery. For example, this disclosure relates to facilitating an extended access network for internet-of-things for a 5G, or other next generation network.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating an extended access network for internet-of-things is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
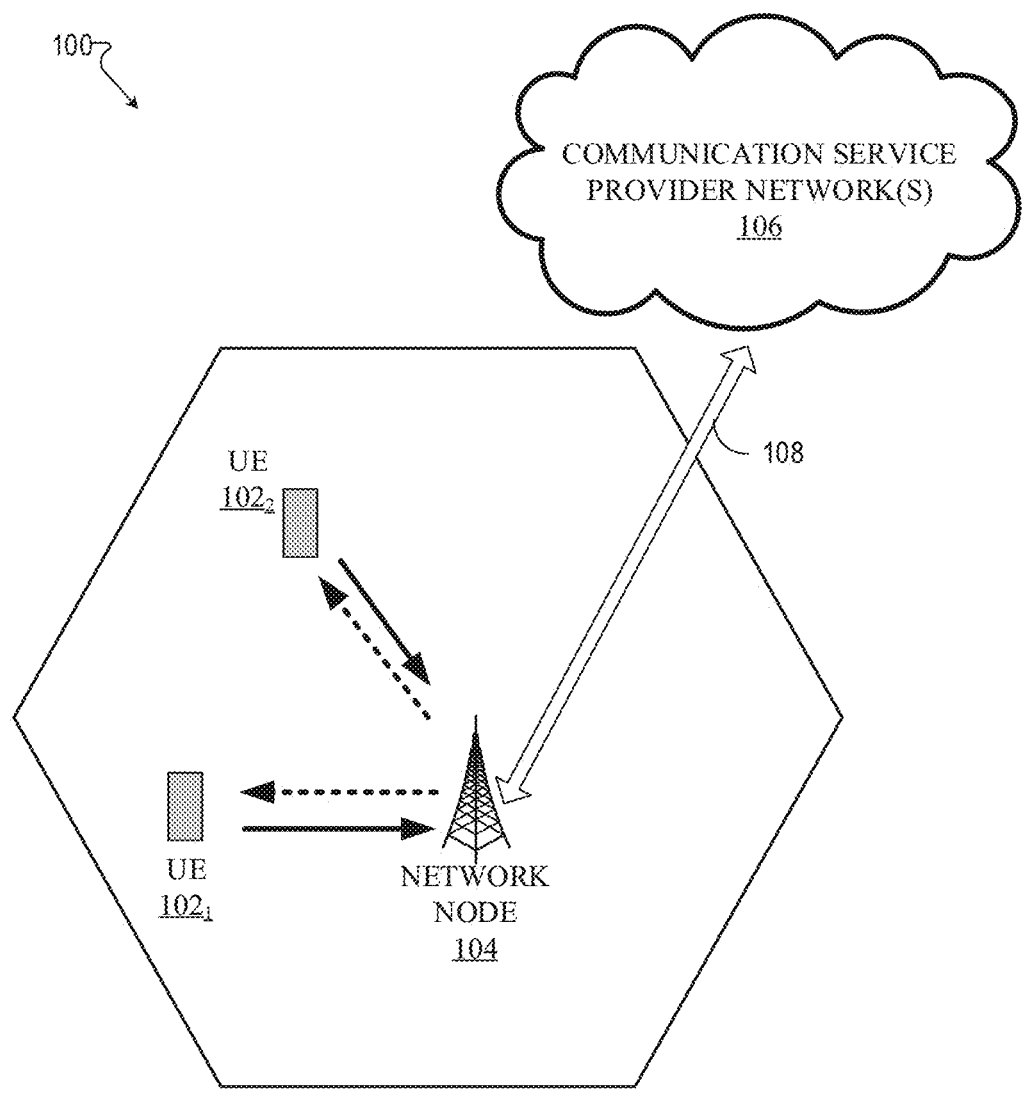
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate an extended access network for internet-of-things for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate an extended access network for internet-of-things for a 5G network. Facilitating an extended access network for internet-of-things for a 5G network can be implemented in connection with any type of device with a connection to the communications network (e.g., a mobile handset, a computer, a handheld device, etc.) any Internet of things (JOT) device (e.g., toaster, coffee maker, blinds, music players, speakers, light bulb, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

An LTE network can be a policy-based traffic management architecture with a PCRF element traditionally controlling the QoS levels and other information (priorities bandwidths, etc.) that manages IP flows that carries a particular application (such as voice, video, messaging, etc.). This policy-based mechanism applies to the IP traffic between the mobile device and the packet data network gateway ("PGW"). In an embodiment of the subject disclosure, software defined networking can be used to provide routing and traffic control for packets sent from the PGW to a destination address. In some embodiments, the SDN controller can also provide traffic control for packets from the mobile device to the destination in some embodiments.

The PCRF and the SDN controller can also communicate about some aspects of a particular application flow so that routing decisions both in the access network (between eNode B and PGW) as well as in the backbone can be made based on the nature of the application and how that particular flow was expected to be treated based on operator policies and user subscription. For example, if a higher QoS is to be applied to a traffic flow carrying voice packet, the service related information such as QoS can be used by SDN controller to make decisions such as mapping and route optimizations. This can enable the entire network to be application aware with a consistent treatment of the packets.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A framework for abstraction of new and existing 5G radios can comprise 3GPP radio technologies as well as the boosting/enhancing capabilities of new and existing micro radios and other short range radio technologies to enable intelligent service delivery over the radio access network as a whole, dynamic access learning capability, and network slicing over 5G access networks. Enhancing layer communication for both control and user planes can be tunneled through the hosting layer and leverage the common transport provided by the hosting layer. The tunneling through the hosting layer can also enable these enhancing radio solutions to access the same radio management functions and can be orchestrated by the same core function.

Radio access network abstraction can provide a separation between the physical radios and a logical view of the network. It can provide a holistic view of pool of various radio resources from various radio technologies. This can allow a network controller to make an intelligent decision on what radio to use to deliver a service based on application requirements. The radio access network abstraction can also have a dynamic learning capability to constantly update the network view of the radio resources upon adding, changing, removing and/or modifying the resources.

Under this framework, various applications (e.g., smart city, connected cars) and/or various customers (e.g., GM, Amazon, etc.) can ask for different services or technologies. Based on their service needs (e.g., latency, speed, etc.), the intelligent control can pick and choose access, backhaul, and/or service delivery based on this framework.

As shown on the figures, the abstraction layer separates the physical radios and logical view of the radio network. It provides a holistic view of pooling of various radio resources from various radio technologies, which not only includes the location of the cells, but also the type of the radio, the coverage, radio condition, radio load condition, power level, security characteristics of the radio technology, etc. and present a radio network graph with the characteristics of the radio resources. In addition, the radio network graph can also have a presentation on network slices and their corresponding characteristics. The logical view and access can allow the SDN controller to make intelligent decisions based on the conditions, radio technology, and what slice to use to deliver a service based on application requirements.

When a new radio node is added, modified (e.g., power level), and/or removed, the radio access network abstraction can provide the dynamic learning capability to constantly update the network view of the radio resources upon the change. For a new service request, the SDN controller can perform based on the application requirements (e.g., service level agreements (SLA)) to intelligently select a radio technology, a proper slice, etc. from the pool of the physical radio resources. The selection of the physical radio resources can be from the hosting layer or an enhancing layer, where all the communication for both the control plane and the user plane can tunneled through the hosting layer and can be administrated by the access slice for that particular service. The tunneling through the hosting layer can enable these boosting or enhancing radio solutions to access the same radio management functions and can be orchestrated by the same core function.

The system can comprise a radio controller function that controls/enables the access radios such as 4G, 5G, Wi-Fi, LPWAN, etc. The access management function can decide what technologies are prioritized for the specific service, such as the slice selection service. Ported functionalities (PVNF) can comprise of any core functionality that amplifies the performance of the access slice, such as MME in 4G technology or an edge computing function where traffic is kept close to the source and results can be transmitted back to the client for a high performance service such as video analysis of on incident at premises. A resource management log can comprise baseband, digital signal processing, medium access control, networking, and management information. This information can be used in similar circumstances that occur for a streamlined, efficient, and intelligent management of the resources. As the log keep grows it can make the decision making process more efficient by referring to similar circumstances, comparing the result, and fine tuning the decision for an optimal result. The intelligent resource management function can consider traffic load, access types (5G, 4G, 3G, Wi-Fi, etc.) and their signal strength, which inline will decide traffic distribution across available access types, and slices already instantiated or available in e-comp to be instantiated. The intelligent resource management function can also decide the optimal physical (connection with transceivers) and functional (vNFs in slices) elements. The intelligent resource management function can also play a role in deciding which transceivers can be used on what spectrum and how much power they will utilize.

Additionally, once the internet-of-things (IOT) device sets up the session with the network, the network does not need to repeat the setup for similar IOT devices. Thus, network traffic can be reduced on the control plane and the user plane. For example, the system can remember what technologies (e.g., Bluetooth, Wi-Fi, LTE, etc.) were used previously and the technology can be stored in the access slice as a default technology so that the system does not have to go through another provisioning process. This info can be stored in a database and facilitated by the intelligent resource management. For example, once a smart light bulb is connected via ZigBee, then the system can remember that Zigbee was used to connect the smart light bulb. Consequently, that same smart light bulb and/or any other smart light bulbs that can be connected to the system via Zigbee as well, without another provisioning process having to occur to facilitate the connection.

In one embodiment, described herein is a method comprising facilitating, by a software-defined network device comprising a processor, receiving, from an internet-of-things device of internet-of-things devices, a first resource request representative of a first requested resource. Based on the receiving the first resource request, the method can comprise facilitating, by the software-defined network device, provisioning the internet-of-things device to utilize a wireless communication protocol, and sending first resource request data representative of the first resource request to an access slice layer of a wireless network. Additionally, in response to the sending the first resource request data, the method can comprise, facilitating, by the software-defined network device, a resource allocation to fulfill the first resource request from the internet-of-things device and facilitating receiving, from the internet-of-things devices other than the internet-of-things device, a second resource request representative of a second requested resource. Furthermore, based on the provisioning the internet-of-things device to utilize the wireless communication protocol, the method can comprise facilitating, by the software-defined network device, provisioning the internet-of-things device to utilize wireless communication protocol.

According to another embodiment, a system can facilitate receiving first resource request data representative of a first resource request from a first internet-of-things device. In response to the receiving the first resource request data, the system can provision the first internet-of-things device to utilize a wireless communication protocol, and receive second resource request data representative of a second resource request from a second internet-of-things device. Furthermore, based on provisioning the first internet-of-things device, the system operations can comprise provisioning the second internet-of-things device to utilize the wireless communication protocol in accordance with the provisioning the first internet-of-things device to utilize the wireless communication protocol.

According to yet another embodiment, described herein is a machine-readable storage medium that can perform the operations facilitating receiving resource request data representative of a resource request from a first internet-of-things device. In response to the receiving the resource request data, the machine-readable storage medium can perform the operations comprising sending the resource request data to an access layer, and provisioning the first internet-of-things device to utilize a wireless communication protocol. Additionally, the machine-readable storage medium can perform the operations comprising facilitating receiving the resource request data representative of the resource request from a second internet-of-things device. Furthermore, in response to the facilitating the receiving the resource request data representative of the resource request from the second internet-of-things device, the machine-readable storage medium can perform the operations comprising facilitating a resource allocation, of a resource, to fulfill the resource request for the second internet-of-things device in accordance with the provisioning of the first internet-of-things device to utilize the wireless communication protocol.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
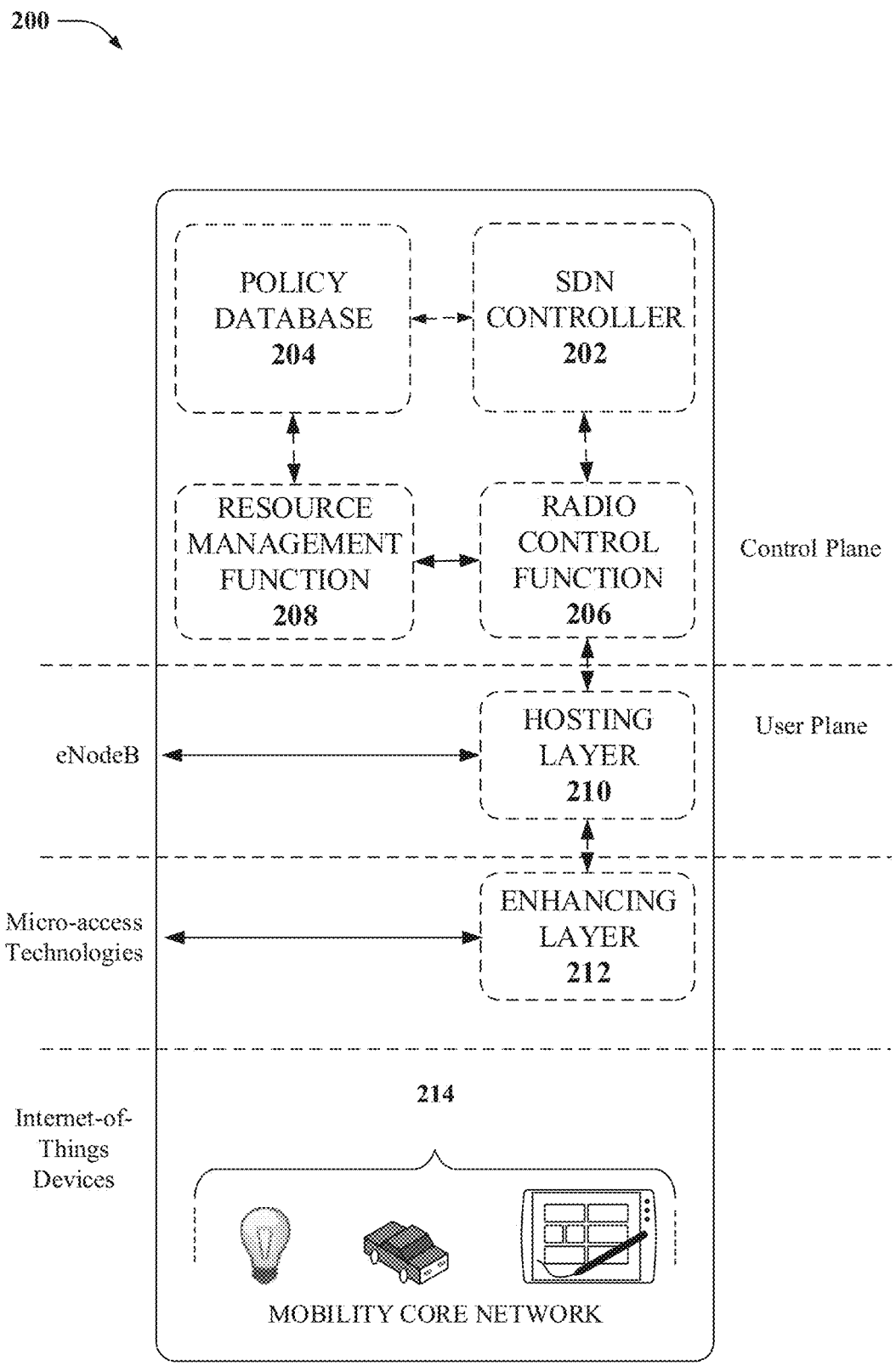
FIG. 2 illustrates an example schematic system block diagram of a mobile network architecture with a software defined networking (SDN) controller according to one or more embodiments.

Referring now to FIG. 2, illustrated is an example schematic system block diagram of a mobile network architecture with a software defined networking (SDN) controller according to one or more embodiments.

A mobility core network 200 can comprise a radio access network that facilitates communications between the mobile devices and mobility core network 200. The mobility core network 200 can comprise a series of components, functions, and/or databases that can be communicatively coupled that provide mobile data and control management. For example, a radio control function 206 and a resource management function 208 can be provided to perform control of the packets traveling in the user plane between mobile devices and the control plane. The resource management function 208 can apply rules and policies based on user related information, subscription material, priority data, network loads, and/or service level agreements stored at a policy database 204. This information can then be passed along from the resource management function 208 to the radio control function 206 to facilitate adding, removing, and/or modifying resources of the user plane via a hosting layer 210 and/or an enhancing layer 212.

In one or more embodiments, the SDN controller 202 can provide control and management of the packets or data. The SDN controller 202 can receive information relating to the rules and policies associated with data transmission sent to and from the policy database 204, and the radio control function 206 can handoff control and management of the data traffic to the SDN controller 202. If there are one or more network function virtualization ("NFVs") in the mobility core network 200, the SDN controller 202 can handle the control plane functions related to traffic sent to and from one or more of the NFVs. Such NFVs can comprise virtualized elements such as virtualized serving gateways (SGWs), virtualized packet data network gateways (PGWs), and other virtualized network elements.

In one or more embodiments, the radio control function 206 and the SDN controller 202 can perform traffic management functions such as route modification for transmission routes of data based on service related information such as QoS. The quality of service control can also be based on an application associated with the packets of data. For instance, if a set of data is related to a service application (e.g., a voice application), the resource management function can determine for the radio the radio control function 206, how many resources it needs from the hosting layer and/or the enhancing layer to accommodate the service application. Therefore, the aforementioned scenario can be achieved based on the service application indicating a bandwidth utilization to the SDN controller 202, and the radio control function 206 assessing the resources of the enhancing layer. This can prompt the radio control function 206 to add, delete, and/or modify resources (e.g., micro-access technologies: Wi-Fi, LPWAN, etc.) on the enhancing layer 212 via a tunneling methodology discussed later with regards to FIG. 5. It should be noted, that based on policies stored at the policy database, in one or more embodiments, one service application can be given priority and/or preferred over another service application with regards to utilization and/or distribution of the resources. Thus, IOT devices 214 can access resources from the SDN controller 202. After the IOT devices 214 have been provisioned, they can access the resources, via the SDN controller 202, based on the policies, service level agreements, priorities, and/or other factors associated with the various layers.

Figure 3:
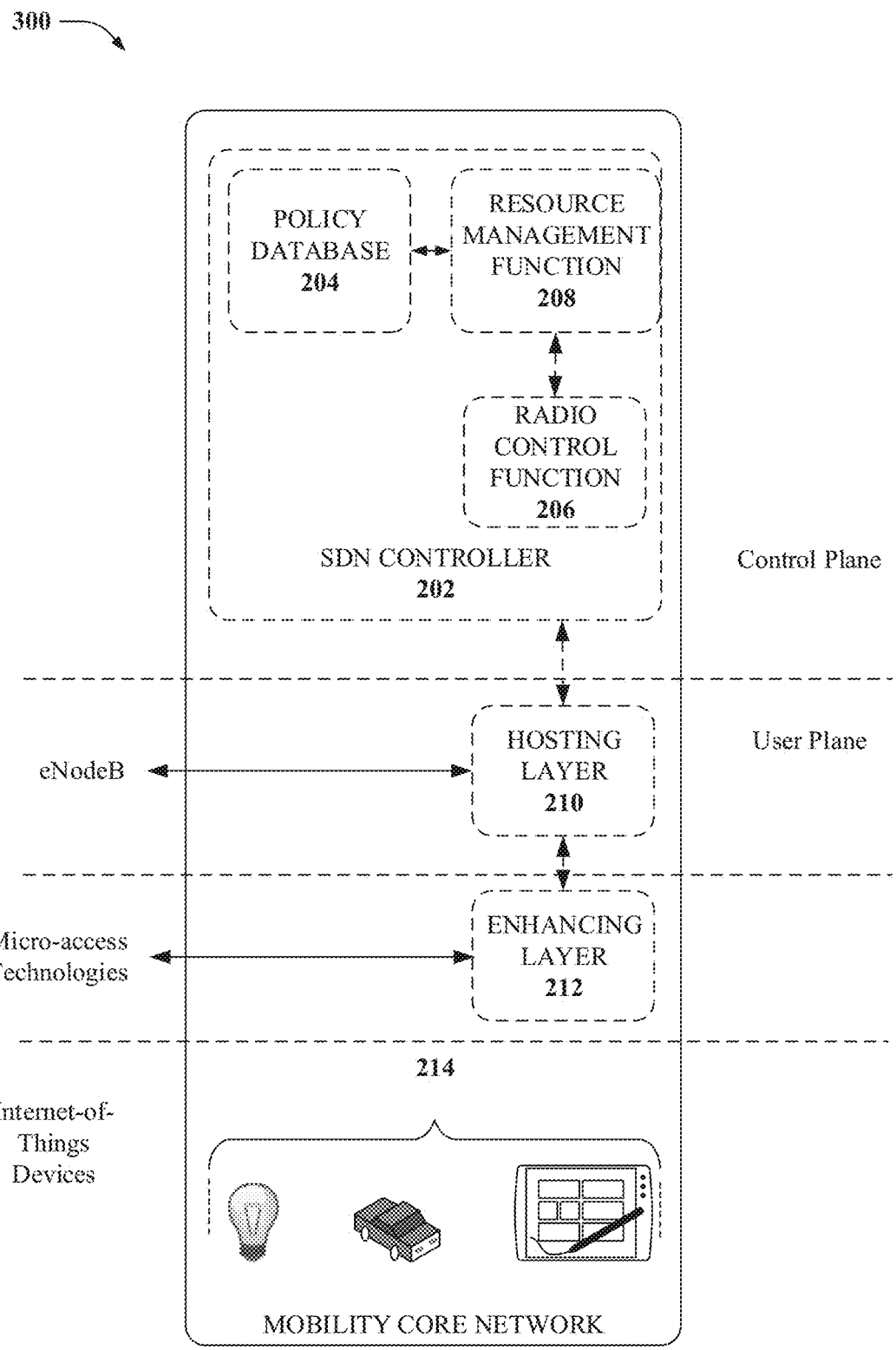
FIG. 3 illustrates an example schematic system block diagram of a mobile network architecture with a software defined networking (SDN) controller according to one or more embodiments.

Referring now to FIG. 3, illustrated is an example schematic system block diagram of a mobile network architecture with a software defined networking (SDN) controller according to one or more embodiments. Repetitive description of like elements employed in other embodiments described herein is omitted for sake of brevity.

FIG. 3 depicts one or more embodiments wherein the mobility core network 300 can comprise an SDN controller 202 that can comprise the policy database 204, the resource management function 208, and the radio control function 206, which can all be communicatively coupled. It should also be noted that in alternative embodiments, the policy database 204 can be hosted at the user plane hosting layer 210 and/or the enhancing layer 212. The resource management function 208 can distribute and/or allocate a specific resource and/or percentage of resources on the enhancing layer 212 and/or the hosting layer 210. The adding or removing resources can be based on the hosting layer 210 policies and/or the enhancing layer 212 policies (e.g., service level agreements, priorities, network loads, etc.). For example, based on a service application request, the resource management function 208 can facilitate distributing 30% of the Wi-Fi resources on the enhancing layer and 70% of the eNode B resources on the hosting layer 210. It can also add and/or remove resources from other services in the same slice if needed. Thus, resources can be dynamically added and/or removed based on a policy, service level agreement, priority, and/or network load of the hosting layer 210 and/or the enhancing layer 212. After the IOT devices 214 have been provisioned, they can access the resources based on the policies, service level agreements, priorities, and/or other factors associated with the various layers.

Figure 4:
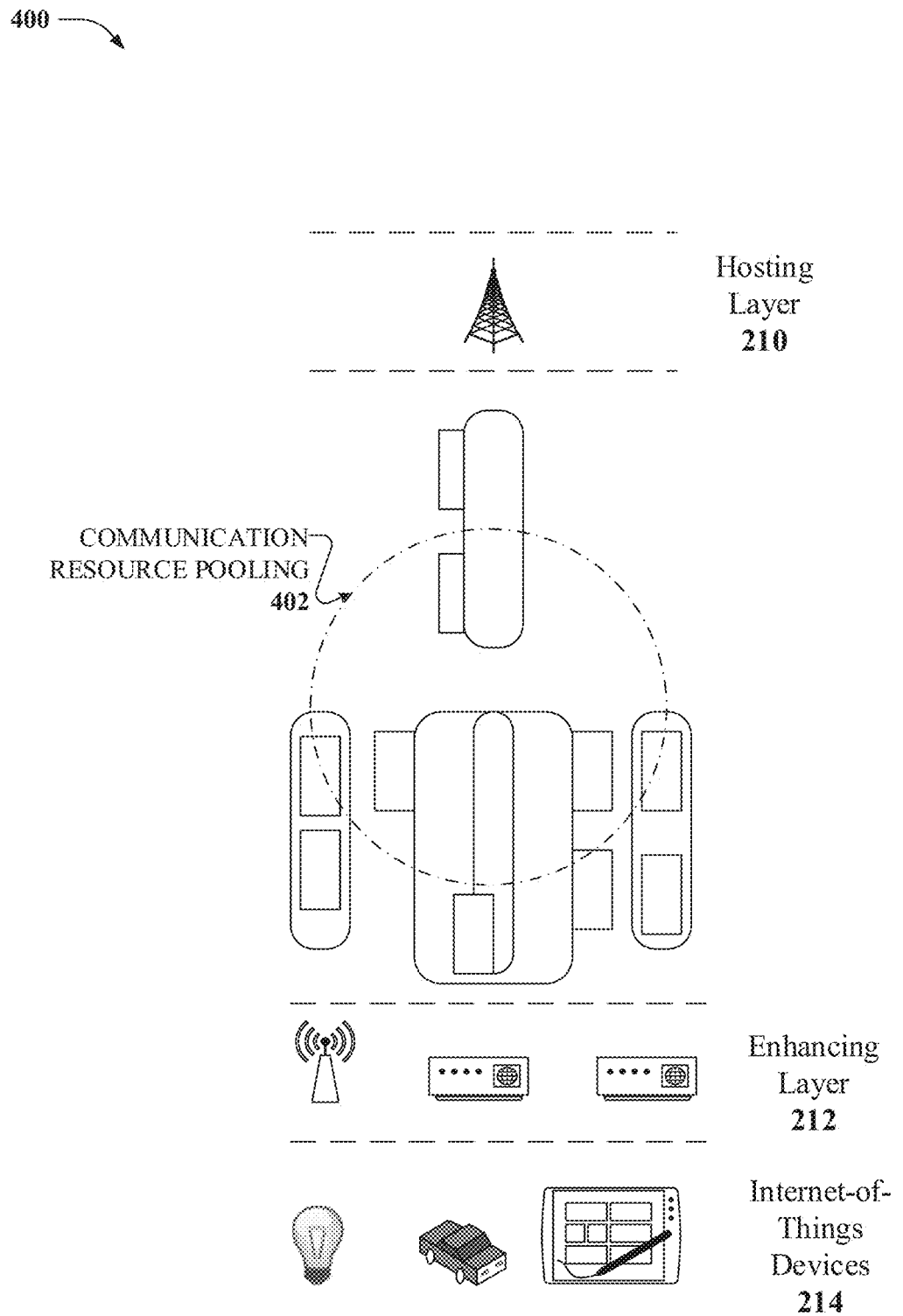
FIG. 4 illustrates an example system of communication resource pooling according to one or more embodiments.
Figure 5:
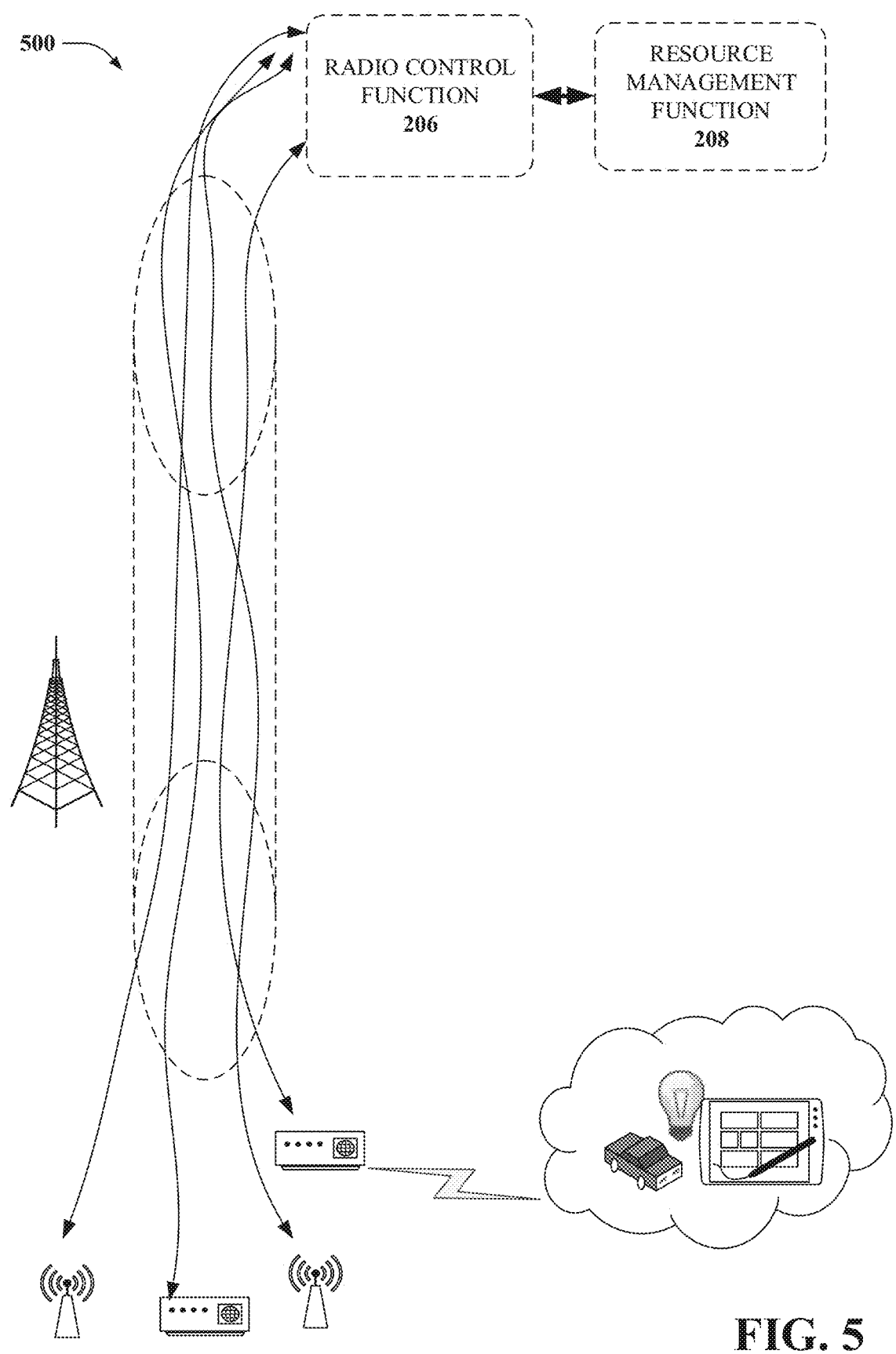
FIG. 5 illustrates an example system of a tunneling procedure according to one or more embodiments.

Referring now to FIG. 4 and FIG. 5, illustrated is an example system 400 of communication resource pooling according to one or more embodiments and an example system of a tunneling procedure according to one or more embodiments.

Because resources (e.g., micro-access technologies: Wi-Fi, LPWAN, etc.) can comprise processors and storage capabilities, the communication portion of the resources can be pooled via a communication resource pooling (CRP) 402 so that the mobility core networks 200, 300 can view multiple resources (e.g., hosting layer 210 resources, enhancing layer 212 resources, etc.) as only one communication resource. This can be accomplished by opening a tunnel between the enhancing layer 212 and the hosting layer 210. For example, the enhancing layer 212 can use the hosting layer 210 as a conduit by opening the tunnel. Since the eNode B already has access to the radio control function 206, instead of setting up a new radio controller function, the mobility core network 200, 300 can set up a tunneling function from the eNode B to the access layer (e.g., control plane) to utilize resources at the enhancing layer 212. Consequently, a new connection does not have to be set up because the mobility core network 200, 300 can use an existing connection and the enhanced layer data can be transported, via the tunnel, to the resource management function 208. Thus, the IOT devices 214 can take advantage of the tunneling function and also reduce resource requests because similar IOT devices 214 do not need to be provisioned if a first similar IOT device 214 has already been provisioned. The tunnel can also be used for other carriers to include their resources on the tunnel as well. The tunnel capacity can also be leased by the other carriers to gain access to additional resources.

Figure 6:
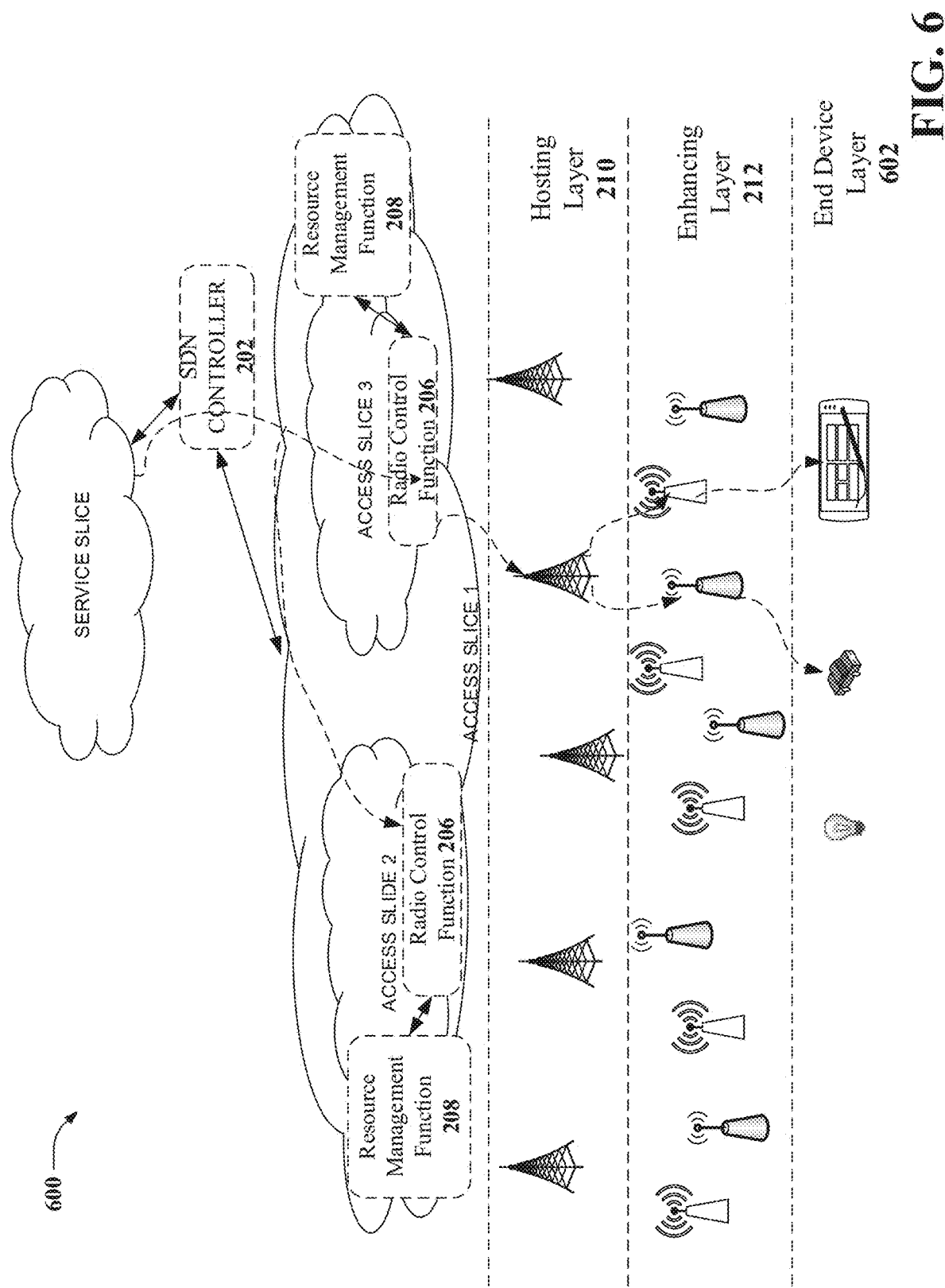
FIG. 6 illustrates an example system comprising multi-layer resource pooling according to one or more embodiments.

Referring now to FIG. 6, illustrated is an example system 600 comprising multi-layer resource pooling according to one or more embodiments.

Additional access technology/resources, such as macro access technology (e.g., eNode B) and micro access technologies (e.g., Wi-Fi, wireless local area network (WLAN), low-power wide area network (LPWAN), long range (LoRa), radio access network (RAN)s, Bluetooth peer-to-peer network, metro cell, etc.), can be added to 5G to address access uniformity issues. For instance, the hosting layer 210 and the enhancing layer 212 can enhance network capacity. The hosting layer 210 can be used as a conduit to send the enhancing layer 212 data to the access network.

Network slices can be created to address a certain need of service call, or transport, or access capability. Thus, the access network can be divided by slices to separately address multiple needs. The slice of an access layer can be vertical or horizontal and can manage a defined number of radios with various frequencies and various capabilities. For example, an access slice can comprise the resource management function 110, the radio control function 206, and other capabilities to aid a specific function. The resource management function 110 can determine, for the radio controller function 206, how many resources it needs for the hosting layer 210 and the enhancing layer 212, which can depend on what type of service it is using. The service can communicate to the access layer what kind of bandwidth it is looking for, which can be controlled by the SDN controller 202.

For example, if a service application running on a service layer communicates to the SDN controller 202 that it requires a lot of bandwidth, and the radio controller function 206 already knows about the enhancing layer resource capacity, then the resource management function 208, on a slice, can access information on the resources of a particular slice and decide where it has additional and/or unused resources (e.g., Wi-Fi, LPWAN, access capability) that it can add to the service application. Alternatively, the resource management function 208 can remove capacity from other service applications that are of a lessor priority and/or that do not need as much capacity. Consequently, the resource management function 208 can distribute and/or allocate a specific resource and/or percentage of resources on the enhancing layer 212 and/or the hosting layer 210. The adding or removing of resources can be based on the hosting layer policies (e.g., policies associated with eNode B devices) and/or the enhancing layer policies (e.g., service level agreements, priorities, network loads, etc.).

The end device layer 602 can comprise IOT devices 214. The IOT devices 214 that have been provisioned previously, can reduce or eliminate the need for similar IOT devices 214 to be provisioned. For example, once a connected car IOT has been provisioned to utilize the Wi-Fi resources of the enhancing layer 212 up to a certain capacity and to utilize the hosting layer 210 resources up to a certain capacity, then the same resources and/or capacity specifications can be utilized for any additional connected car IOTs that utilize the system 600.

Figure 7:
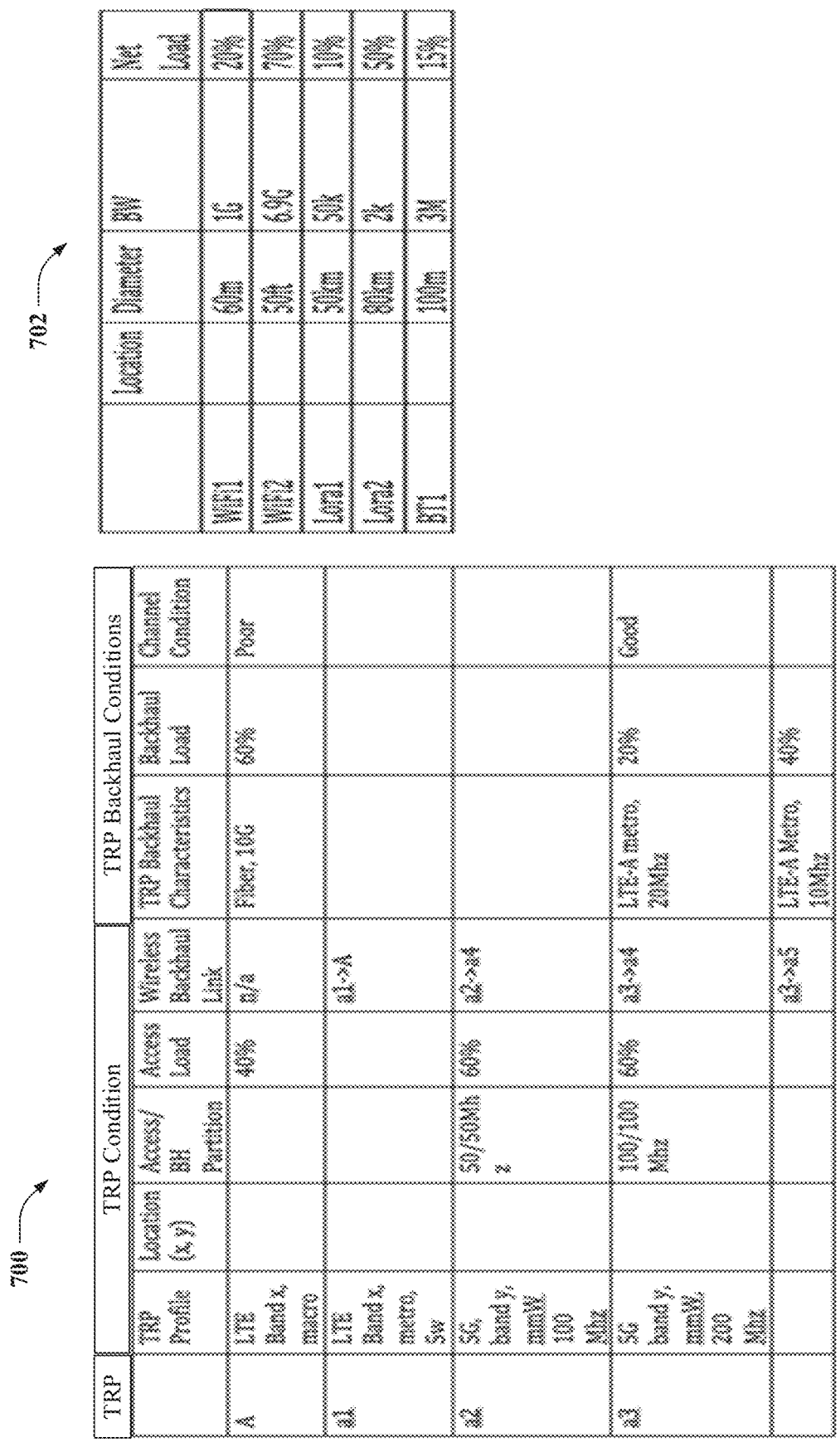
FIG. 7 illustrates example tables of radio resource characteristics according to one or more embodiments.

Referring now to FIG. 7, illustrated are example tables of radio resource characteristics according to one or more embodiments. FIG. 7 represents the attributes of the hosting layer 210 and the enhancing layer 212. Thus, the hosting layer attributes 700 can be compared to the enhancing layer attributes 702. For example, if the hosting layer 210 is loaded, the enhancing layer 212 has resource capacity that can be used, and the enhancing layer 212 meets the service level agreement, then the enhancing layer 212 can be used. Consequently, if the conditions are better for the enhancing layer 212, then the enhancing layer 212 resources can be used. However, if the conditions are better on the hosting layer 210, then the hosting layer 210 resources can be used.

Figure 8:
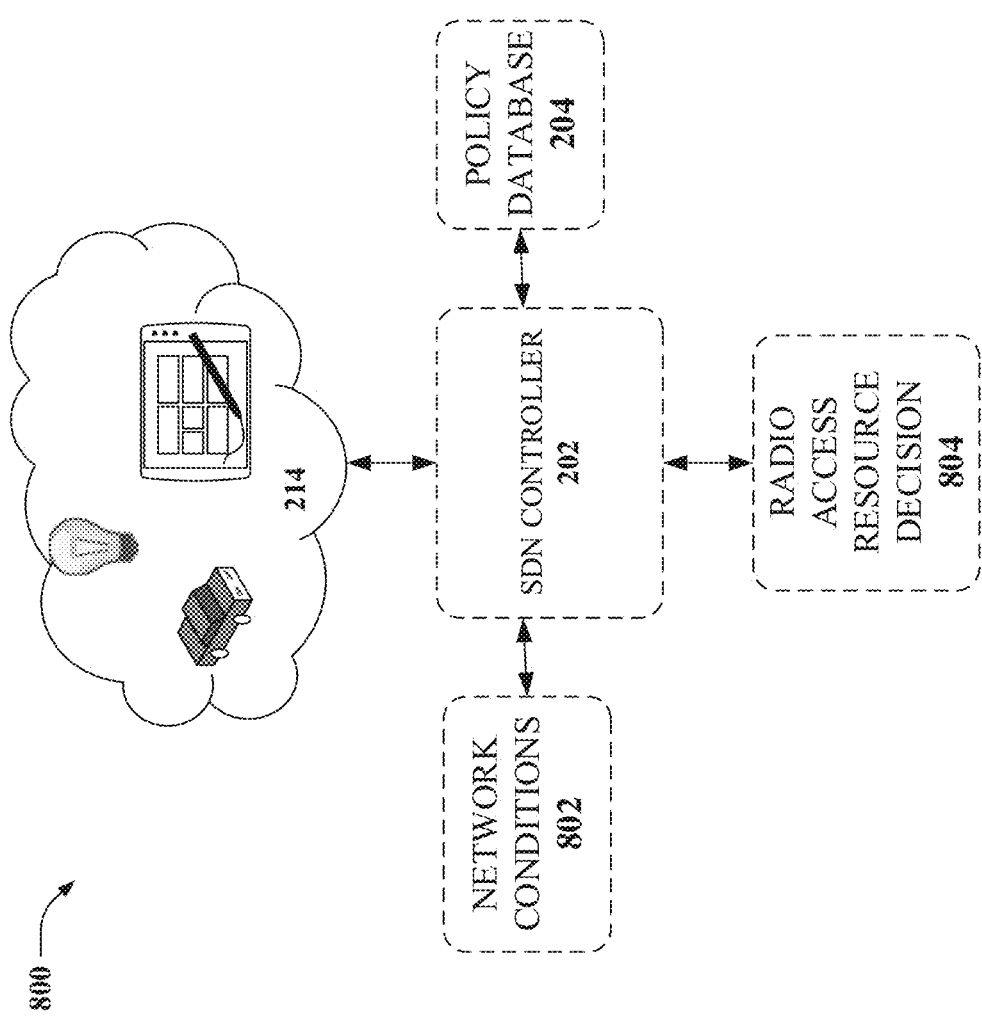
FIG. 8 illustrates example software-defined network inputs and outputs according to one or more embodiments.

Referring now to FIG. 8 illustrated are example software-defined network inputs and outputs according to one or more embodiments. FIG. 8 depicts a framework of the system 800 using the SDN controller 202 to decide the connectivity between the IOT devices 214 and the application services. Data associated with the IOT devices 214 can be input to the SDN controller 202. Therefore the SDN controller 202 can have access to data including, but not limited to: destinations of the IOT devices 214, IP addresses of the IOT devices 214, and other info associated with the IOT devices 214. The SDN controller 202 can also know the types of services to be associated with the IOT devices. Network conditions 802 (e.g., size, bandwidth, access side, backhaul, load conditions, link conditions, etc.) associated with the hosting layer attributes 700 and the enhancing layer attributes 702 can be transmitted to the SDN controller 202 as well. Additionally, policies 204 that can reflect various protocols (e.g., device type, access RAT, application, etc.) can also be sent to the SDN controller 202. For example, if the IOT device is a smart light bulb, then the system can use a particular route for routing packets and/or use a particular slice for the services associated with smart light bulbs. Therefore, based on the IOT devices 214, the network conditions 802, and/or the policies 204, the SDN controller 202 can then make a decision (e.g., radio access resource decision 804) on how to route traffic and send that information to the radio access network, where the radio access network can make decisions on how to allocate resources for a particular slice.

Figure 9:
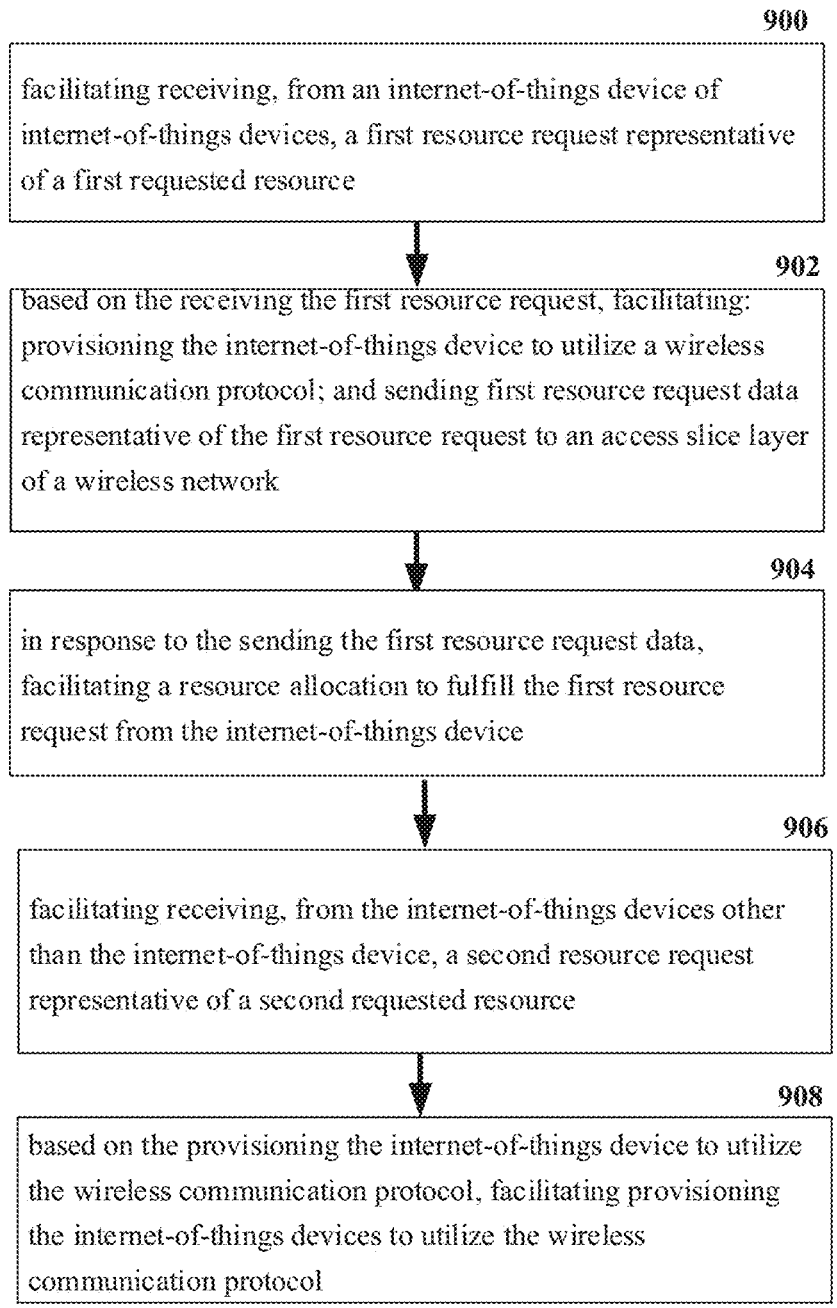
FIG. 9 illustrates an example flow diagram of a method for multi-layer resource pooling for internet-of-things devices according to one or more embodiments.

Referring now to FIG. 9, illustrated is an example flow diagram of a method for multi-layer resource pooling for internet-of-things devices according to one or more embodiments. At element 900, a method can comprise receiving (e.g., via the SDN controller 202), from an internet-of-things device 214 of internet-of-things devices, a first resource request representative of a first requested resource. Based on the receiving the first resource request, the method can comprise facilitating provisioning (e.g., via the SDN controller 202) the internet-of-things device 214 to utilize a wireless communication protocol, and sending (e.g., via the SDN controller 202) first resource request data representative of the first resource request to an access slice layer of a wireless network at element 902. Additionally, in response to the sending the first resource request data, the method can comprise, facilitating a resource allocation (e.g., via the SDN controller 202) to fulfill the first resource request from the internet-of-things device 214 at element 904 and facilitating receiving (e.g., via the SDN controller 202), from the internet-of-things devices other than the internet-of-things device 214, a second resource request representative of a second requested resource at element 906. Furthermore, based on the provisioning the internet-of-things device 214 to utilize the wireless communication protocol, the method can comprise facilitating provisioning (e.g., via the SDN controller 202) the internet-of-things device 214 to utilize wireless communication protocol at element 906.

Figure 10:
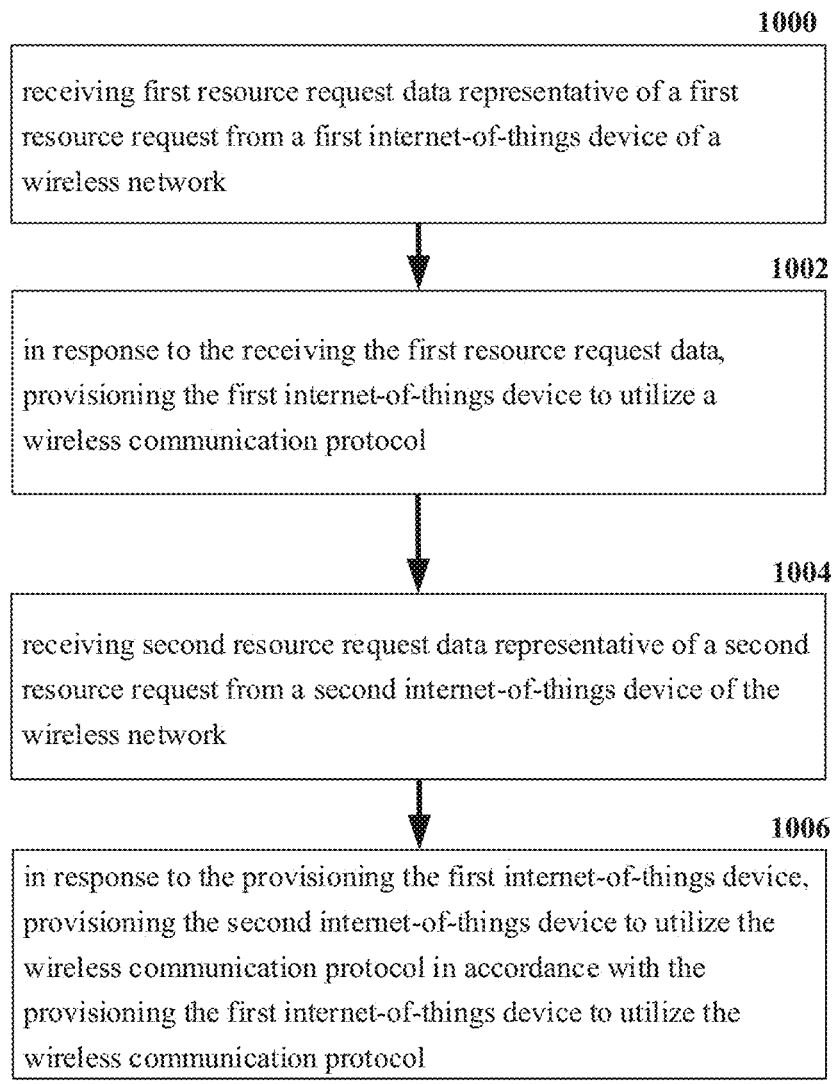
FIG. 10 illustrates an example flow diagram of a system for multi-layer resource pooling for internet-of-things devices according to one or more embodiments.

Referring now to FIG. 10, illustrates an example flow diagram of a system for multi-layer resource pooling for internet-of-things devices according to one or more embodiments. At element 1000, a system can facilitate receiving (e.g., via the SDN controller 202) first resource request data representative of a first resource request from a first internet-of-things device 214. In response to the receiving the first resource request data, at element 1002, the system can provision (e.g., via the SDN controller 202) the first internet-of-things device 214 to utilize a wireless communication protocol (e.g., Wi-Fi), and at element 1004, the system can receive (e.g., via the SDN controller 202) second resource request data representative of a second resource request from a second internet-of-things device 214. Furthermore, based on provisioning the first internet-of-things device 214, the system can comprise provisioning (e.g., via the SDN controller 202) the second internet-of-things device 214 to utilize the wireless communication protocol in accordance with the provisioning the first internet-of-things device 214 to utilize the wireless communication protocol at element 1006.

Figure 11:
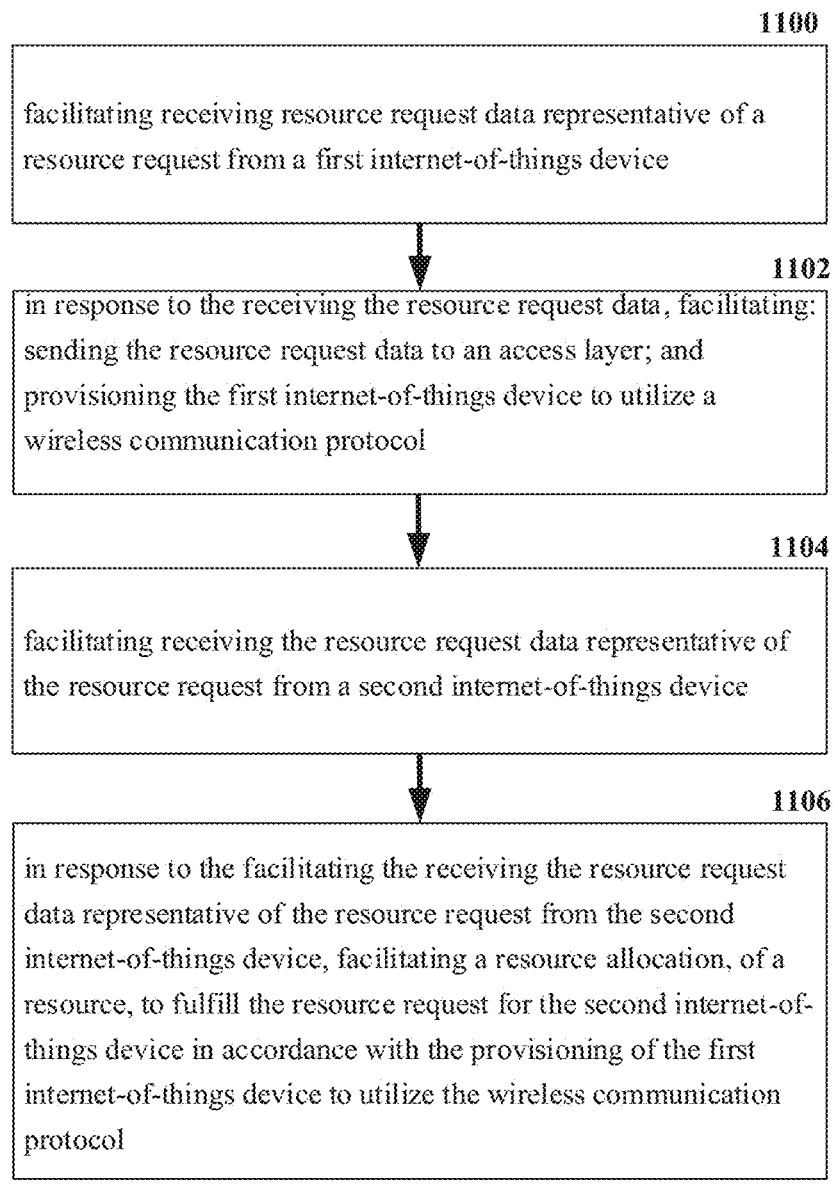
FIG. 11 illustrates an example flow diagram of a machine-readable medium for multi-layer resource pooling for internet-of-things devices according to one or more embodiments.

Referring now to FIG. 11, illustrated is an example flow diagram of a machine-readable medium for multi-layer resource pooling for internet-of-things devices according to one or more embodiments. At element 1100 a machine-readable storage medium can facilitate receiving (e.g., via the SDN controller 202) resource request data representative of a resource request from a first internet-of-things device 214. In response to the receiving the resource request data, the machine-readable storage medium can perform the operations comprising sending (e.g., via the SDN controller 202) the resource request data to an access layer, and provisioning (e.g., via the SDN controller 202) the first internet-of-things device 214 to utilize a wireless communication protocol (e.g., Wi-Fi) at element 1102. Additionally, at element 1104, the machine-readable storage medium can perform the operations comprising facilitating receiving (e.g., via the SDN controller 202) the resource request data representative of the resource request from a second internet-of-things device 214. Furthermore, in response to the facilitating the receiving the resource request data representative of the resource request from the second internet-of-things device 214, the machine-readable storage medium can perform the operations comprising facilitating (e.g., via the SDN controller 202) a resource allocation, of a resource, to fulfill the resource request for the second internet-of-things device 214 in accordance with the provisioning of the first internet-of-things device 214 to utilize the wireless communication protocol (e.g., Wi-Fi) at element 1106.

Figure 12:
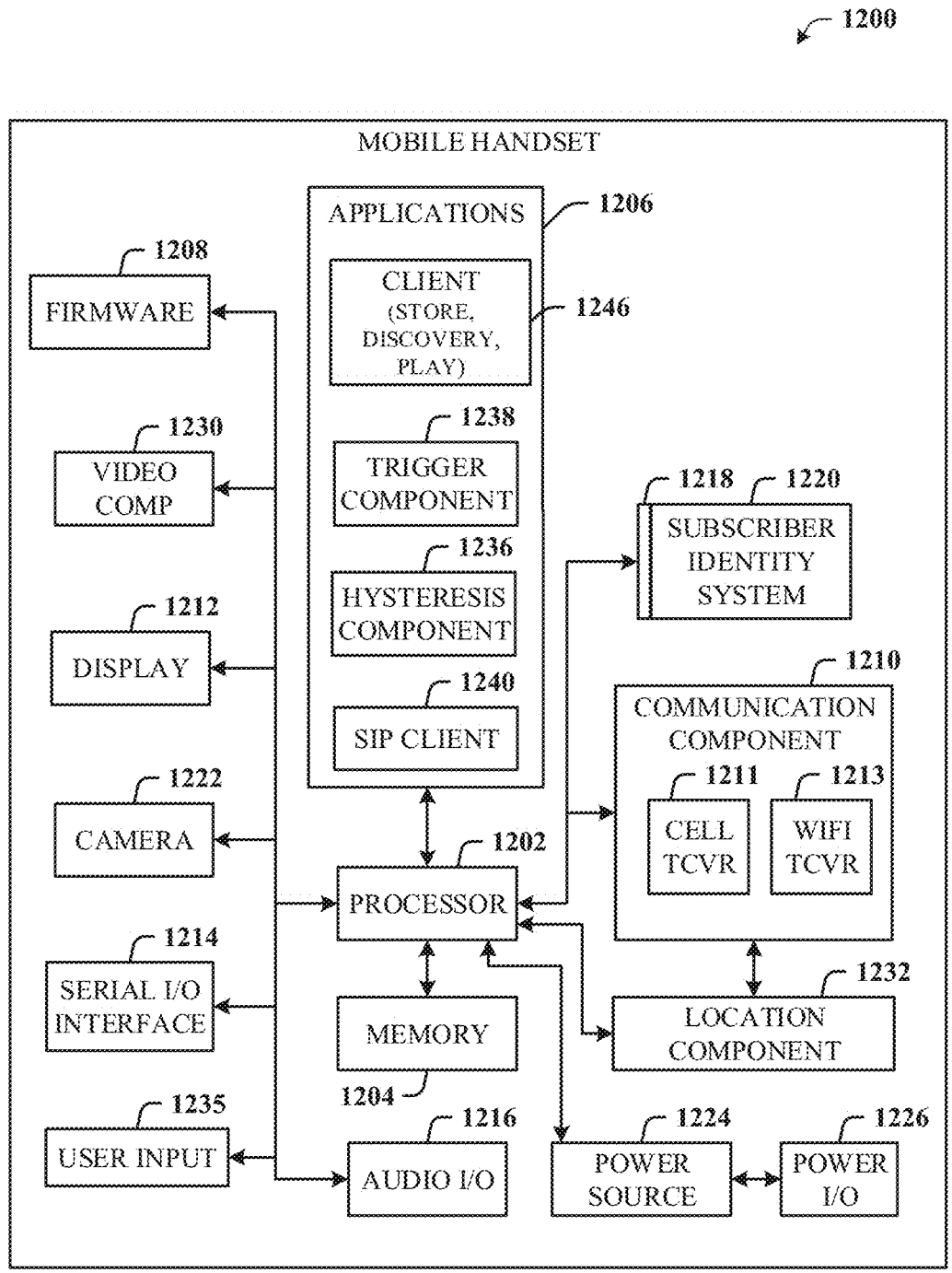
FIG. 12 illustrates an example block diagram of an example mobile handset operable to engage in a system architecture that facilitates secure wireless communication according to one or more embodiments described herein.

Referring now to FIG. 12, illustrated is a schematic block diagram of an exemplary end-user device such as a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 13:
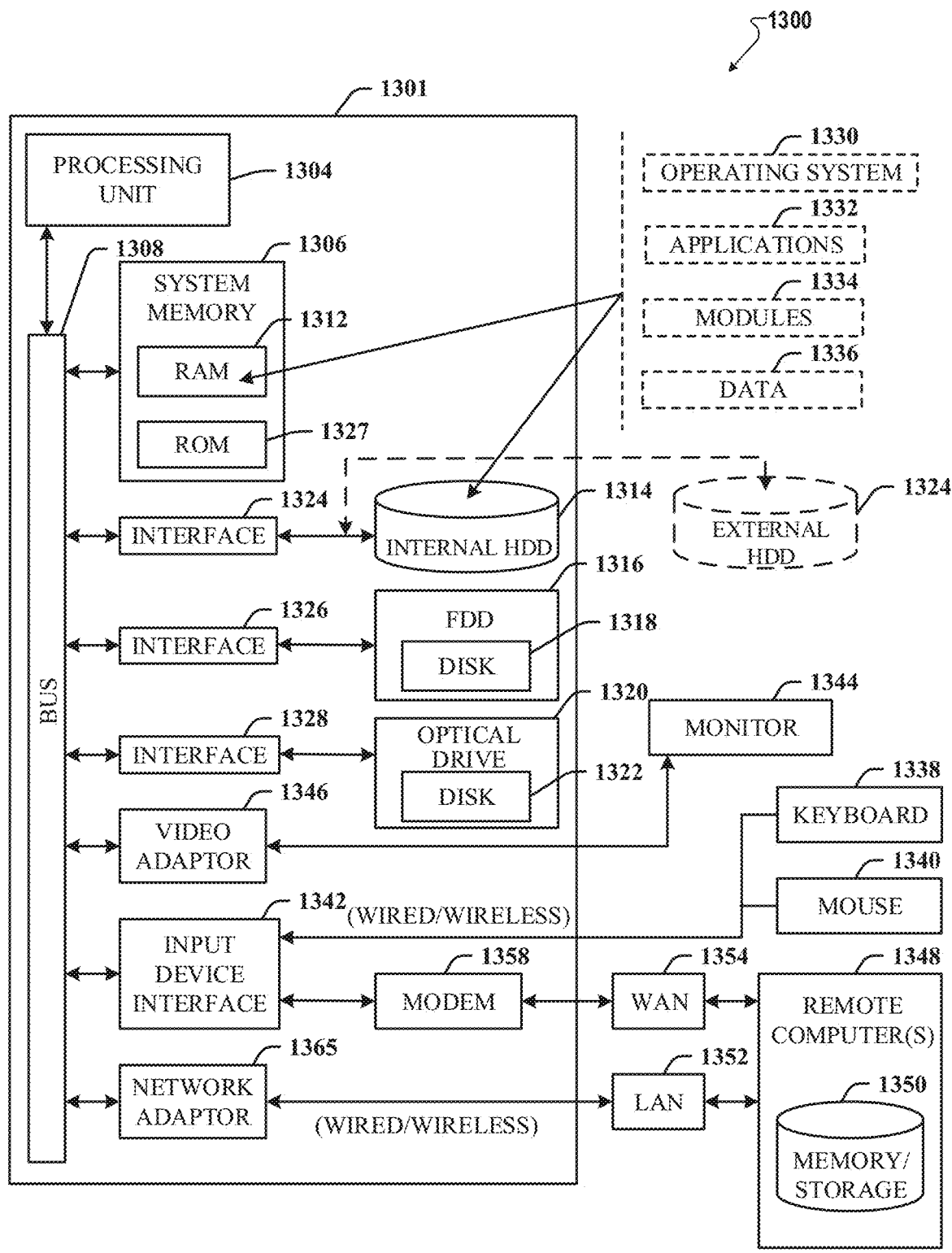
FIG. 13 illustrates an example block diagram of an example computer operable to engage in a system architecture that facilitates secure wireless communication according to one or more embodiments described herein.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   facilitating, by software-defined network equipment comprising a processor, receiving, from an internet-of-things device of a group of internet-of-things devices, a resource request representative of a requested resource;
   based on receiving the resource request, facilitating, by the software-defined network equipment:
   provisioning the internet-of-things device to utilize a communication protocol; and
   sending resource request data representative of the resource request to a network access slice layer;
   in response to sending the resource request data, facilitating, by the software-defined network equipment, a resource allocation to fulfill the resource request from the internet-of-things device;
   based on provisioning the internet-of-things device to utilize the communication protocol, facilitating, by the software-defined network equipment, provisioning the group of internet-of-things devices to utilize the communication protocol, resulting in a first provisioning of the internet-of-things device; and
   facilitating, by the software-defined network equipment, storing the communication protocol in the access slice layer to prevent a second provisioning of the internet-of-things device.

2. The method of claim 1, wherein provisioning the internet-of-things device to utilize the communication protocol comprises provisioning the internet-of-things device to utilize a wireless fidelity device.

3. The method of claim 1, wherein facilitating the internet-of-things devices to utilize the communication protocol comprises facilitating the internet-of-things devices to utilize a wireless fidelity device.

4. The method of claim 1, wherein the requested resource is a bandwidth to be allocated to the internet-of-things device based on a policy.

5. The method of claim 1, further comprising:
   based on agreement data representative of a service level agreement associated with a hosting layer, allocating, by the software-defined network equipment, the requested resource to the internet-of-things device.

6. The method of claim 1, wherein the internet-of-things device is a smart light bulb, and wherein the internet-of-things devices are smart light bulbs.

7. The method of claim 6, wherein provisioning the smart light bulb prevents provisioning of other smart light bulbs.

8. A system, comprising:
a processor; and
a memory that stores executable instructions that, when executed by the processor, facilitate performance of operations, comprising:
receiving resource request data representative of a resource request from an internet-of-things device via a network:
in response to receiving the resource request data, provisioning the internet-of-things device to utilize a communication protocol; and
sending the resource request data representative of the resource request to an access slice layer enabled via the network;
in response to sending of the resource request data, facilitating a resource allocation to fulfill the resource request from the internet-of-things device;
based on provisioning the internet-of-things device to utilize the communication protocol, facilitating provisioning internet-of-things devices to utilize the communication protocol, resulting in a first provisioning of the internet-of-things device; and
storing the communication protocol in the access slice layer to prevent a second provisioning of a second internet-of-things device.

9. The system of claim 8, wherein the operations further comprise:
tunneling, via a hosting layer enabled via the network, a resource of an enhancing layer enabled via the network to fulfill the resource request for the internet-of-things device.

10. The system of claim 9, wherein tunneling the resource comprises utilizing an existing connection between base station equipment of the hosting layer and a software-defined network equipment.

11. The system of claim 8, wherein the resource allocation comprises a bandwidth of a wireless fidelity device, accessed via a tunneling procedure, to be utilized by the internet-of-things device.

12. The system of claim 8, wherein the operations further comprise:
removing a resource from a first network service to be utilized by a second network service.

13. The system of claim 8, wherein the operations further comprise:
provisioning the second internet-of-things device to utilize the communication protocol in accordance with provisioning the first internet-of-things device.

14. The system of claim 8, wherein the operations further comprise:
aggregating resources into a communication resource pool to be utilized by software-defined network equipment.

15. A non-transitory machine-readable medium, comprising executable instructions that, when executed by a processor, facilitate performance of operations, comprising:
facilitating receiving first resource request data representative of a first resource request from a first internet-of-things device;
in response to receiving the first resource request data, facilitating:
sending the first resource request data to an access layer; and
provisioning the first internet-of-things device to utilize a communication protocol;
in response to sending the first resource request data, facilitating a first resource allocation to fulfill the first resource request from the first internet-of-things device;
facilitating storing the communication protocol in the access layer to preclude a second provisioning of a second internet-of-things device; and
facilitating a second resource allocation to fulfill a second resource request for the second internet-of-things device in accordance with provisioning of the first internet-of-things device to utilize the communication protocol.

16. The non-transitory machine-readable medium of claim 15, wherein the operations further comprise:
facilitating receiving second resource request data representative of the second resource request from the second internet-of-things device.

17. The non-transitory machine-readable medium of claim 15, wherein facilitating the first resource allocation comprises terminating a utilization of a resource.

18. The non-transitory machine-readable medium of claim 15, wherein provisioning the first internet-of-things device to utilize the communication protocol comprises provisioning the first internet-of-things device to utilize a Bluetooth device.

19. The non-transitory machine-readable medium of claim 15, wherein the resource allocation is an amount of bandwidth to be allocated to the first internet-of-things device based on a policy associated with a network hosting layer.

20. The non-transitory machine-readable medium of claim 15, wherein the operations further comprise:
based on agreement data representative of a service level agreement associated with a network hosting layer, allocating a resource to the first internet-of-things device.

* * * * *